United States Patent

[11] 3,608,783

| [72] | Inventor | Ary van der Lely<br>10, Weverskade, Maasland, Netherlands |
|---|---|---|
| [21] | Appl. No. | 798,282 |
| [22] | Filed | Feb. 11, 1969 |
| [45] | Patented | Sept. 28, 1971 |
| [32] | Priority | Feb. 16, 1968, Nov. 21, 1968 |
| [33] | | Netherlands |
| [31] | | 68,02206 and 68,16608 |

[54] SPREADING IMPLEMENTS HAVING A REMOVABLE FEEDER
8 Claims, 13 Drawing Figs.

| [52] | U.S. Cl. | 222/142 |
|---|---|---|
| [51] | Int. Cl. | B67d 5/62 |
| [50] | Field of Search | 222/177, 178, 413, 236, 142, 135 |

[56] References Cited
UNITED STATES PATENTS

| 1,912,172 | 5/1933 | Bailey | 222/177 X |
| 2,759,637 | 8/1956 | Gandrud | 222/177 X |
| 2,804,998 | 9/1957 | Kirschmann | 222/177 |
| 3,128,921 | 4/1964 | Henderson | 222/177 X |
| 3,194,385 | 7/1965 | Barnese | 222/413 X |
| 3,322,429 | 5/1967 | Cervelli | 222/178 X |
| 3,420,452 | 1/1969 | Vaughan | 222/178 X |

*Primary Examiner*—Stanley H. Tollberg
*Attorney*—Mason, Mason and Albright

ABSTRACT: An agricultural spreading implement has one or more containers for material and the container includes at least one feeder member rotatably supported in its container. The feeder member is supported at points to extend substantially lengthwise of the interior of its container and in operation, urge material towards at least an outlet opening. The feeder member is mounted for easy access and removal. A masking member can be moved relative to the bottom of the container to open or close the outlet.

INVENTOR
ARY VAN DER LELY
by Mason, Mason & Albright

INVENTOR
ARY VAN DER LELY
by Mason, Mason & Albright
Attorneys

SPREADING IMPLEMENTS HAVING A REMOVABLE FEEDER

Known fertilizer distributors, seed drills and other spreading implements of the kind mentioned above suffer from the disadvantage that the removal of the feeder member(s) for cleaning, adjustment, repair and so on is complicated and tedious so that it tends to be avoided whenever possible with a consequent reduction in the efficiency of the implement. Accordingly, it is an object of the present invention to overcome or at least reduce this disadvantage and enable alternative feeder members to be employed without difficulty.

According to the invention, there is provided a spreading implement of the kind set forth, wherein the or each feeder member is mounted in the container or corresponding container in a readily releasable manner.

For a better understanding of the invention, and to show how the same may be carried into effect, reference will now be made, by way of example, to the accompanying drawings, in which:

FIG. 13 is a scrap elevation as seen in the direction indicated by an arrow XIII in FIG. 11, Referring to the drawings, the cultivating implement or cultivator which is illustrated has a frame which is generally indicated by the reference 1 in which a substantially horizontally disposed shaft 2 is rotatably mounted. The shaft 2 extends substantially perpendicular to the intended direction of operative travel of the cultivator which is indicated by an arrow A in FIG. 1 of the drawings and is provided with a plurality of soil-working members 2A that are spaced apart from one another both along the length of the shaft 2 and around the longitudinal axis of that shaft. The shaft 2 is, in fact, supported by two substantially vertical plates 3 of the frame 1 between which plates 3 lie a plurality of spring steel rods 4 arranged in horizontally spaced-apart relationship. The leading ends of the rods 4 are connected to a baffle plate or screen which is not visible in the drawings but which partially surrounds the shaft 2 and its soil-working members 2A. The arrangement of the rods 4 is such that they form a resilient grille or grating. An arm 5 is pivotally connected to the outer side of one of the plates 3, the free and rearmost end of said arm 5 carrying the axle of a ground wheel 6. An adjusting member 7 which includes a manually rotatable spindle extends between an anchorage at the top of the plate 3 and a bracket fastened to the arm 5 and can be operated to turn said arm 5 about the pivotal mounting to raise or lower the ground wheel 6 with respect to the frame 1. A screening hood 9 (FIG. 2) has its leading edge pivotally mounted between the plates 3 by means of substantially horizontally aligned pins 8 that define an axis extending perpendicular to the direction A. The screening hood 9 has a downward extension in the form of a wall of a box 35 that will be described below. The lowermost edge of the downward extension which has just been mentioned either bears against, or is located in very close proximity to, the surface of the soil which has been worked by the foregoing members 2A during use of the cultivator.

Vertical plates 10 are located at the opposite lateral sides of the screening hood 9 and a container in the form of a box 11 extends perpendicularly between the two plates 10. It will be seen from the drawings that, in fact, the box 11 is constituted principally by the two plates 10, a portion of the screening hood 9 and a plate 12 that extends substantially perpendicular to the portion of the screening hood 9 which has just been mentioned. The top of the box 11 is closed by a lid or cover 13. The bottom of the box 11 is curved and is provided with a number of relatively spaced triangular openings 14. The openings 14 are, in fact, preferably spaced apart from one another by distances of 16 centimeters. A masking member 15 embraces the bottom of the box 11 and is slidable to and fro with respect thereto in a horizontal direction that is perpendicular to the direction A. The masking member 15 is maintained in position relative to the box 11 by lugs 16 that are fastened to the plate 12 at appropriate points.

The masking member 15 is formed with triangular outlets 17 that correspond in size and shape to the triangular openings 14 and that can be brought into register with those openings as required to regulate the rate of flow of material out of the box 11. A dosing member in he form of a roller 18 is located inside the box 11 with its axis of rotation substantially coincident with the axis of curvature of the curved bottom of the box. The roller 18 takes the form of a central tube having a plurality, such as eight, of rods or bars 19 fastened to its external surface in such a way that said rods or bars 19 extend parallel to one another and to the axis of the central tube in regularly spaced relationship around that axis. Thus, a number of recesses, corresponding in number to the rods or bars 19 that are provided, are formed around the roller 18, each recess extending lengthwise of said roller. It will be appreciated that, during rotation of the roller 18, material contained in the box 11 is positively conveyed to the openings 14 inside the recesses formed between the rods or bars 19. It will be seen from FIG. 2 of the drawings that the outlets 17 open into a gap 20 which is formed between the lowermost edge of the screening hood 9 and the uppermost edge of the aforementioned downward extension of that screening hood. The gap 20 extends throughout the width of the screening hood 9 and, during use of the cultivator, material from the interior of the box 11 can be fed through the gap 20 to the leading side of the hood 9.

Figure 3:
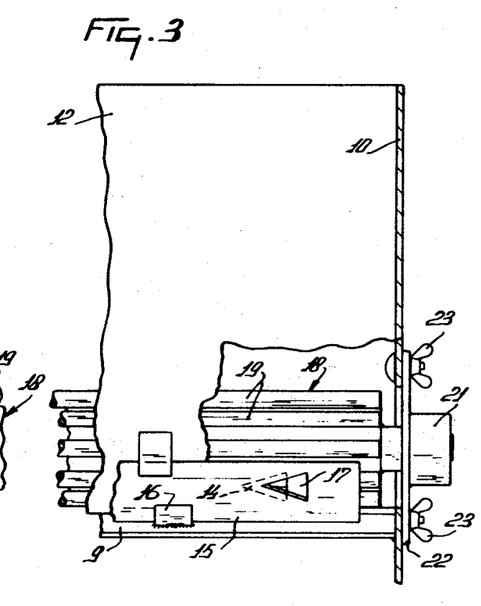
FIG. 3 is a scrap elevation, to an enlarged scale, as seen in the direction indicated by the arrow III of FIG. 2.
Figure 4:
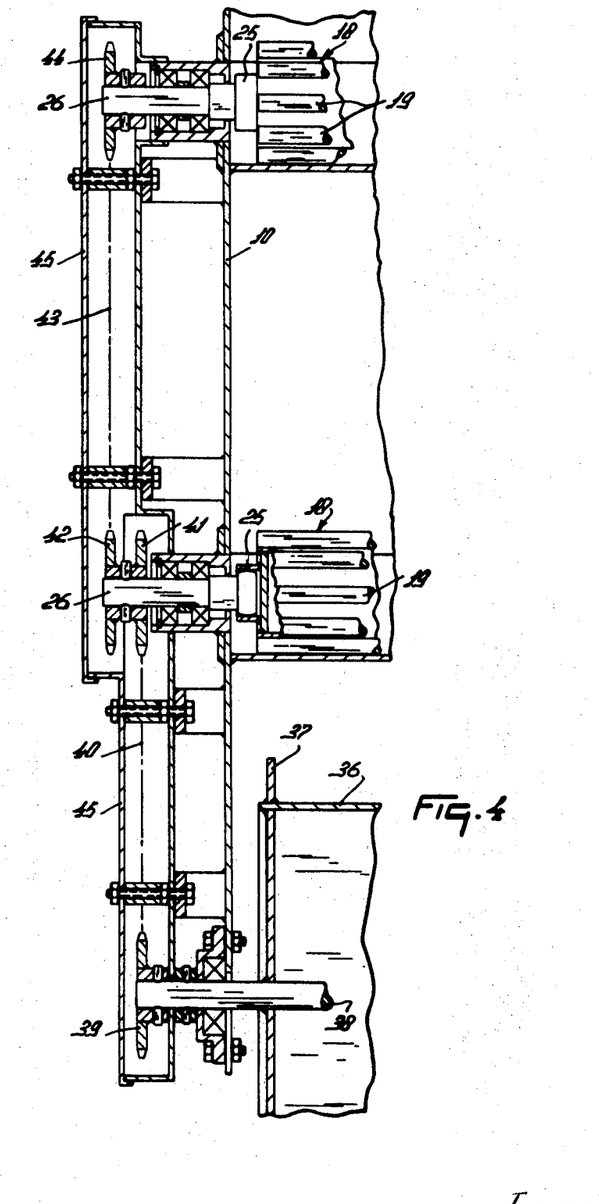
FIG. 4 is a section, to an enlarged scale, taken on the line IV—IV of FIG. 1.

It can be seen from FIGS. 3 and 4 of the drawings that the roller 18 has a stub shaft at one of its ends received in a horizontal bearing 21 carried by a vertical plate 22 which is releasably secured to one of the two plates 10 by bolts or studs that cooperate with wing nuts 23. Thus, when the plate 22 is in its operative position, it closes an opening in the vertical plate 10 which opening is of sufficient diameter to allow the roller 18 to be passed axially therethrough. The end of the roller 18 that is remote from the plate 22 carries a socket 25 (FIG. 4) of noncircular internal configuration, said socket being in driven communication with the similarly profiled end of a driving shaft 26. The socket 25 is axially disengaged from the driving shaft 26 upon removal of the roller 18 from the interior of the box 11. In order to enable the masking member 15 to be moved lengthwise along the bottom of the box 11, said member 15 carries a pin 27 to which one end of an arm 28 is pivotally connected. The opposite end of the arm 28 is pivotally connected by a pin 29 to one end of a lever 30 whose fulcrum is afforded by a pivot pin 31 projecting from the lowermost and rearmost side of the plate 12. The upper end of the lever 30 can be moved by hand and bears against a sector plate 33 formed with an arcuate slot 32 whose center of curvature coincides with the axis of the pin 31. A bolt or the like is entered through the slot 32 and through a hole in the lever 30 and its shank is provided with a wing nut 34A which can be tightened to retain the lever 30 in any chosen setting relative to the sector plate 33 and thus retain the masking member 15 in a corresponding setting lengthwise of the bottom of the box 11.

Figure 2:
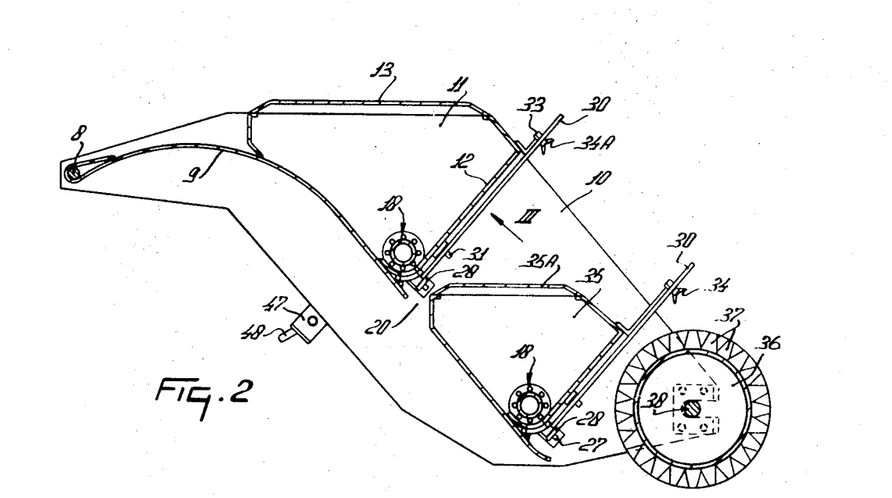
FIG. 2 is a sectional side elevation, to an enlarged scale, of part of the cultivator of FIG. 1.

It can be seen from the drawings, and particularly from FIG. 2 of those drawings, that a major portion of the box 11 together with the roller 18 and the associated parts for controlling the rate of flow of material out of the box 11 are located between the uppermost level of the screening hood 9 and the level of the foot of the extension of said hood which is in contact with, or in very close proximity to, the ground surface during operation of the cultivator. The box 11 is, in fact, intended to contain powdered, granular or crystalline fertilizer that is to be mixed with the top soil during the cultivation thereof.

As previously mentioned, the lowermost edge of the gap 20 is afforded by the upper end of a wall of the container or box 35, said wall constituting a downward extension of the screening hood 9 which is approximately coplanar with the neighboring region of the hood 9 itself. The box 35 is of smaller capacity than the box 11 and is located beneath said box 11. The box 35 has a lid or cover 35A and its shape and construction are substantially identical to those of the box 11 except in size. The box 35 is also provided with a dosing roller 18 and associated parts that are substantially identical in construction and arrangement to the corresponding parts that are associated with the box 11. Accordingly, the same references are employed to indicate such parts as have been used to relate to the box 11 and the elements that are associated therewith. However, it will be noted that the openings 14 in the bottom of the box 35 and the corresponding outlets 17 in the associated masking member 15 are preferably spaced apart from one another by distances of about 8 centimeters. Moreover, material leaving the openings 14 and outlets 17 which have just been mentioned arrives at the rearmost side of the extension of the screening hood 9 rather than at the foremost side thereof in the case of the box 11. The box 35 is provided with control mechanism for its masking member 15, said control mechanism being substantially identical to that which can be seen best in FIG. 3 in respect of the box 11 but being provided with a wing nut 34 that corresponds to the wing nut 34A.

Figure 1:
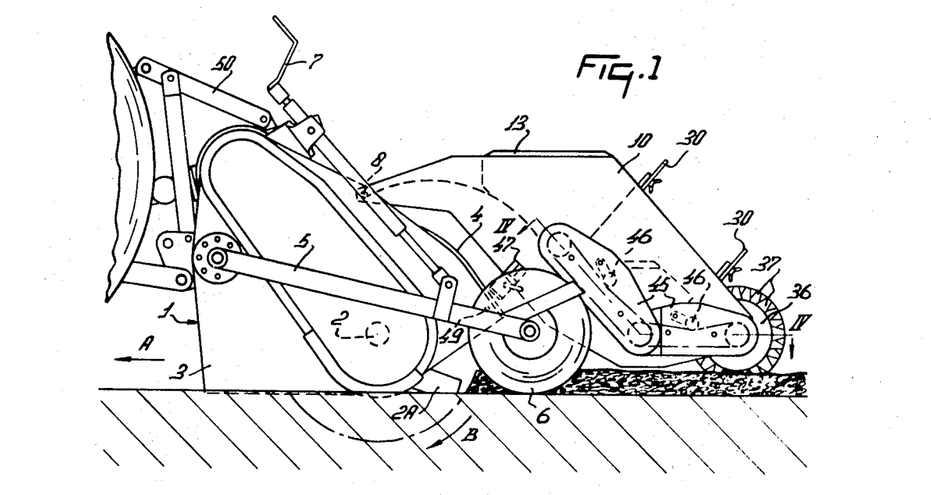
FIG. 1 is a somewhat diagrammatic side elevation of a cultivating implement or cultivator in accordance with the invention mounted at the rear of an agricultural tractor.

The box 35 and the dosing mechanism that is associated therewith is intended for the sowing of seeds into the cultivated soil and, once again, it will be noted that both the box 35 and the flow control of dosing mechanism that is associated therewith is located between the uppermost level of the screening hood 9 and the level of the foot of the extension of that hood which foot normally touches the ground surface, or is located in very close proximity to the ground surface, during use of the cultivator. A pressure roller 36 is rotatably mounted between the two plates 10 and is located to the rear of the box 35 behind the region in which seeds will be delivered to the cultivated soil. The roller 36 extends throughout the length of the shaft 2 and is provided with a plurality of soil-engaging teeth 37 which bite into the soil and tend to ensure that the roller 36 rotates continuously during use of the cultivator. The roller 36 has a central mounting shaft 38 one end of which is provided with a sprocket wheel 39 (FIG. 4). The shaft 38 extends substantially parallel to the shaft 2 and the sprocket wheel 39 at its end is in driving connection, by way of a transmission chain 40, with a sprocket wheel 41 that is fastened to the driving shaft 26 for the dosing roller 18 associated with the box 35. A second sprocket wheel 42 is mounted alongside the sprocket wheel 41 and this second sprocket wheel is in driving communication, by way of a transmission chain 43, with a sprocket wheel 44 that is fastened to the end of the driving shaft 26 for the dosing roller 18 associated with the box 11. Both of the chains 40 and 43 are contained within corresponding casings 45 which casings also house spring-loaded jockey sprocket wheels or rollers 46 (FIG. 1) arranged to maintain the chains 40 and 43 in tension at all times.

One of the vertical plates 10 carries a forked bracket 47 (FIG. 2) which houses a spring-loaded locking pin 48. When the cultivator is transported from one place to another without performing any working operation, it is intended to be raised clear of contact with the ground by the three-point lifting device or hitch of an agricultural tractor or other vehicle and, under these conditions, the screening hood 9 and the parts that are connected thereto can be maintained in a raised transport position by entering the tip of the locking pin 48 in a hole 49 (FIG. 1) formed in one of the vertical plates 3 of the frame 1. The front of the frame 1 is provided with a coupling member 50 which may be employed, in a generally known manner, in connecting the cultivator to the three-point lifting device or hitch of an agricultural tractor or other vehicle in the manner which can be seen in outline in FIG. 1 of the drawings.

In the use of the cultivating implement or cultivator which has been described, the coupling member 50 is connected to the three-point lifting device or hitch of an agricultural tractor or other vehicle and a forwardly projecting rotary input shaft (not shown) of the implement is placed in driven connection with the power takeoff shaft of the same tractor or other vehicle with the aid of an intermediate telescopic transmission shaft having universal joints at its opposite ends. When the cultivator is moved over a field in the direction A, the shaft 2 is rotated in the direction indicated by an arrow B in FIG. 1 of the drawings by way of intermediate transmission members which are not illustrated and which are not relevant to the present invention. The soil displayed by the soil-working members 2A is displaced around the shaft 2 beneath the aforementioned baffle or the like and is eventually thrown against the spring steel rods 4. Stones, roots, hard lumps of soil and other agricultural debris cannot pass through the gaps between the rods 4 and are guided downwardly along those rods to the bottom of the cavity excavated by the soil-working members 2A. Loose finely divided top soil, on the other hand, passes readily between the rods 4 and is subsequently guided downwardly by the hood 9 and its extension to fall back to the ground on top of any stones, roots or the like. The latter are thus effectively buried beneath a fine seed bed. When required, fertilizer and/or seeds can be delivered to the cultivated soil from the respective boxes 11 and 35. The levers 30 are preset to give the required rates of flow and it will be appreciated that delivery will not commence until drive from the roller 36 rotates the two rollers 18. It is noted once again that both fertilizer and seed are delivered at locations between the uppermost level of the screening hood 9 and the level of the foot of the extension of that hood.

In addition to driving the rollers 18, the pressure roller 36 compacts the seed bed and presses the seeds into the soil to a sufficient extent. When the rollers 18 require cleaning, they can be removed lengthwise through the openings in the two plates 10 that are normally covered by the corresponding plates 22. The cultivating implement which has been described is particularly useful in reseeding old meadows and other grassland and it will be appreciated that its use enables the top soil to be cultivated and fertilized and fresh grass seed to be sown in a single operation so that it is unnecessary for subsequent implements to move over the field creating unsightly tracks and causing other damage to the freshly sown seed bed. It is noted that it is within the scope of the invention to employ either fertilizer feeding mechanism alone or seed-feeding mechanism alone and it will be obvious that a cultivating implement which has both such mechanisms could employ either one or the other of them alone and could be used for the insertion into the cultivated soil of additional materials. For example, a soil pesticide could be mixed with the fertilizer and a fungicide and/or bird repellent could be mixed with the grass or other seeds.

Figure 5:
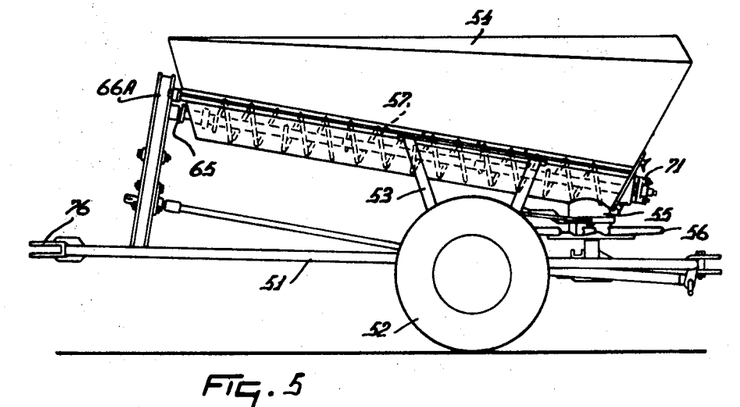
FIG. 5 is a side elevation of a spreading implement in accordance with the invention.
Figure 6:
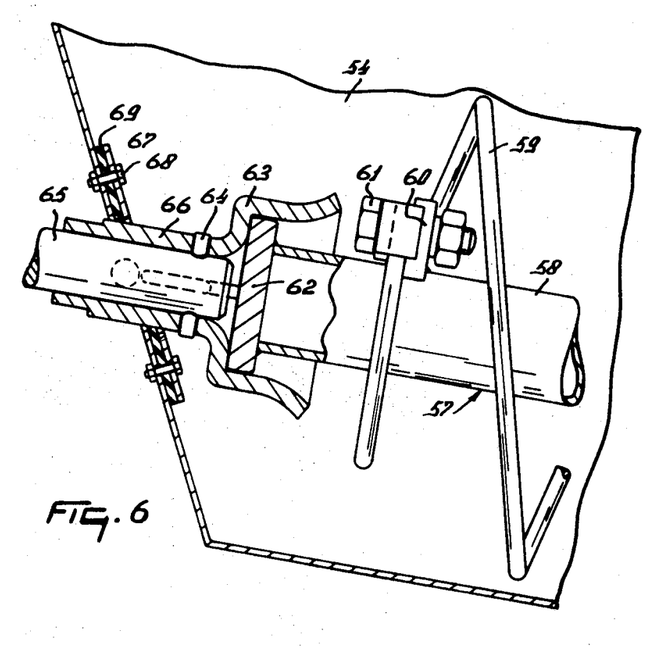
FIG. 6 is a part sectional elevation, to an enlarged scale, illustrating the arrangement of parts at the front of the hopper of the implement of FIG. 5 in greater detail.
Figure 7:
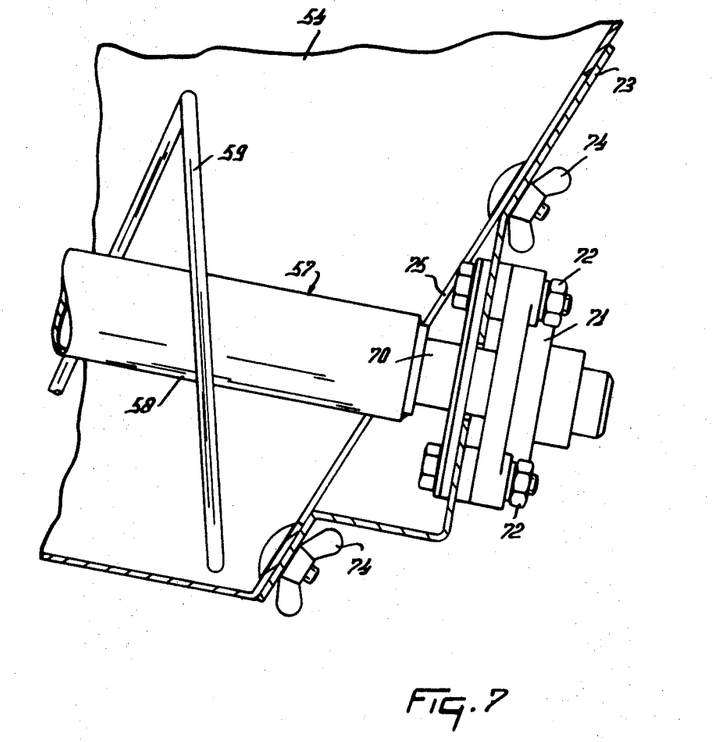
FIG. 7 is a view similar to FIG. 6 but showing the arrangement at the rear of the hopper of the implement of FIG. 5 in greater detail.

Referring to FIGS. 5 to 7 of the drawings, the spreading implement which is illustrated is a large capacity implement intended primarily for the distribution of powdered or granular fertilizer and the like over fields. The implement has a frame 51 which is supported a little to the rear of its center by a pair of large ground wheels 52. A supporting structure 53 carries a large container in the form of a hopper 54 that extends generally lengthwise of the implement. The hopper 54 is approximately V-shaped in cross section and it can be seen from FIG. 5 of the drawings that its bottom (i.e. the rounded apex of the V) slopes gently downwards from the front to the rear of the hopper, that is to say, from the left to the right in FIG. 5. A cylindrical outlet port 55 is provided at the lowermost and rearmost end of the bottom of the hopper 54, said outlet port 55 communicating with an immediately underlying rotary spreading member 56. The way in which the spreading member 56 is constructed, arranged and controlled will not be further described since it is not relevant to the present invention.

A rotary feeder member 57 extends lengthwise of the interior of the hopper 54 immediately above the bottom thereof and is intended to ensure that a substantially unbroken supply of the material within the hopper 54 reaches the outlet port 55 for distribution by the blades of the spreading member 56 during use of the implement. The front and rear ends of the feeder member 57 are rotatably supported and the curved (in cross section) bottom of the hopper 54 has its center of curvature substantially coincident with the axis of rotation of the member 57. The feeder member 57 has a central tube 58 whose longitudinal axis substantially coincides with the axis of rotation just mentioned, said tube 58 being surrounded by a number, such as six, of spring steel helices 59 each of which has its leading end fastened to the tube 58 with the aid of a bracket 60 and a clamping bolt 61.

The leading end of the tube 58 which can be seen in FIG. 6 of the drawings is provided with a boss 62 of noncircular configuration. The boss 62 may, for example, be generally square in outline. The boss 62 fits in the interior of a socket 63 whose internal configuration matches that of the boss 62. The socket 63 is fastened to a rotary stub shaft 65 with the aid of a transverse pin 64, both the shaft 65 and a surrounding hublike extension 66 of the socket 63 being entered through an opening in the front wall of the hopper 54. The leading wall of the hopper 54 is nonperpendicularly inclined to the axis of the stub shaft 65 and an apertured plate 67, formed with a similarly dimensioned hole to the one in the front wall of the hopper 54, compresses a sealing or stuffing member 69 against the front wall and around the extension 66 with the aid of small bolts 68. It will be apparent that the sealing or stuffing member 69 serves to prevent appreciable leakage of material through the front wall of the hopper 54 around the socket extension 66. During use of the implement, the shaft 65 is rotated slowly with the aid of a drive mechanism 66A (FIG. 5) which, once again, it is not necessary to describe in detail for the purposes of the present invention.

The rear end of the tube 70 which can be seen in FIG. 7 of the drawings has a rigidly mounted stub shaft 58 which is received in a rotary bearing 71 that is fastened to a profiled support plate 73 by bolts 72. The support plate 73 can be fastened to the rear wall of the hopper 54, both above and below the bearing 71, by wing nuts 74 that cooperate with fixed bolts, studs or the like. It will be seen from FIG. 7 of the drawings that the support plate 73 closes a large opening 75 in the rear wall of the hopper 54.

In the use of the fertilizer spreading implement which has been described, a draw bar 76 at the leading end of its frame 51 is coupled to the tow bar or hitch of an agricultural tractor or other vehicle. The power takeoff shaft of the same tractor or other vehicle is connected, in known manner, to a rotary input shaft of the drive mechanism 66A and the feeder member 57 is thus rotated at a slow speed within the hopper 54. The helices 59 tend to prevent caking, bridging and the like of fertilizer within the hopper 54 and promote a uniform and unbroken flow of the fertilizer to the outlet port 55. The fertilizer flows to the spreading member 56 at a controlled rate and is distributed onto the ground by the rotating blades of said spreading member 56. The spreading member 56 is rotated, at a much greater speed than the feeder member 57, by drive which is also derived from the power takeoff shaft of the towing tractor or other vehicle.

The feeder member 57 can be removed from the interior of the hopper for cleaning, maintenance or repair in a very simple manner merely by unscrewing the wing nuts 74 and subsequently drawing the feeder member axially rearwards through the opening 75 which opening, it will be seen from FIG. 7 of the drawings, is of somewhat larger diameter than the diameter of the helices 59. The boss 62 merely lifts out of the socket 63 and can be slipped back into the socket 63, without difficulty, upon replacement of the feeder member 57. The feeder member 57 is refixed in its appointed position merely by replacing the wing nuts 74 in their appointed positions, the support plate 73 simultaneously closing the opening 75.

The spreading implement which is illustrated in FIGS. 8 to 13 of the drawings is a seed drill which has a frame that is generally indicated by the reference 77. The frame 77 includes upper and lower beams 78 and 79 that are spaced apart from one another vertically but both of which extend substantially horizontally perpendicular to the intended direction of operative travel of the seed drill which is indicated by an arrow A in FIG. 8 of the drawings. The upper and lower beams 78 and 79 are interconnected at central regions of their lengths by two horizontally spaced-apart and vertically extending strips 80. Upper support brackets 81 and lower support brackets 82 project rearwardly from the opposite ends of the two beams 78 and 79, the upper support brackets 81 being formed at their bottoms with horizontally bent over portions 83 while the lower support brackets 82 are formed at their tops with similarly horizontally bent over portions 84. Vertical studs 85 interconnect the rearmost ends of the two pairs of upper and lower bent over portions 83 and 84 and said studs are surrounded, between the portions 83 and 84, by sleeves 86. Each sleeve 86 is fastened to a corresponding container in the form of a hopper 87 and extends throughout part of its length internally of the corresponding hopper. The neighboring ends of the hoppers 87 are connected to strips 88 and these strips converge forwardly of the implement to have their leading ends fastened to brackets 89 carried at the rear of the upper beam 78.

Figure 11:
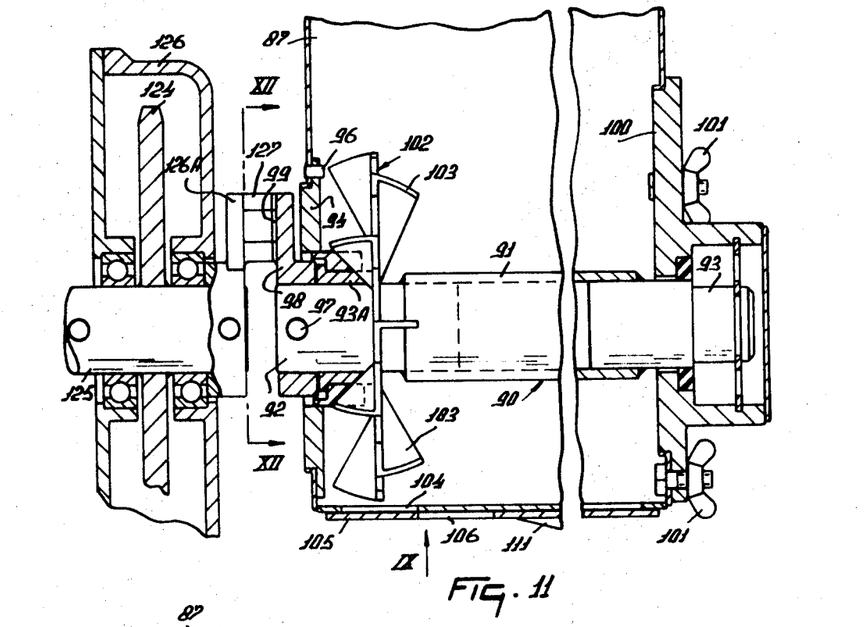
FIG. 11 is a sectional rear elevation, to an enlarged scale, showing the details of the interior of a hopper of the seed drill.
Figure 12:
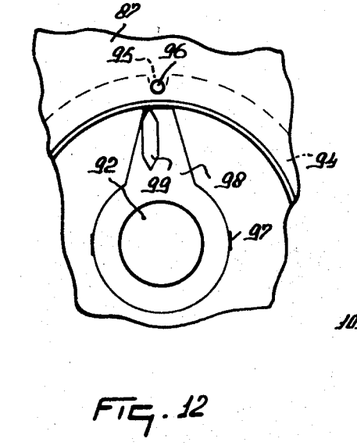
FIG. 12 is a section taken on the line XII—XII of FIG. 11.
Figure 13:
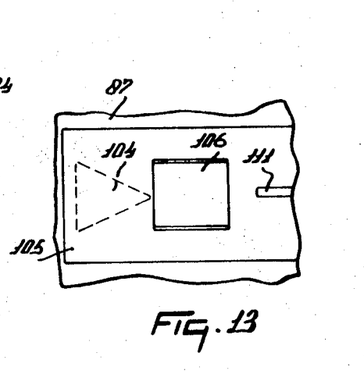

Each hopper 87 contains a rotary feeder member 90, the bottom of the corresponding hopper 87 being curved in such a way that, in cross section the center of curvature of said bottom substantially coincides with the axis of rotation of the feeder member 90. Each feeder member 90 has a central tube 91 that extends lengthwise of the corresponding hopper 87, i.e., substantially horizontally perpendicular to the direction A. Each central tube 91 is provided at its opposite ends with stub shafts 92 and 93 (FIG. 11), each stub shaft 92 being journaled in a bearing 93A which is carried by a circular plate 94 whose edge is formed with a notch 95 (FIG. 12) which registers with a dowel 96 that projects into the interior of the corresponding hopper 87 from the end wall thereof that cooperates indirectly with the stub shaft 92. The end of the stub shaft 92 that projects beyond the hopper 87 has an arm 98 fastened to it with the aid of a transverse pin 97, said arm carrying a face projection 99 (FIGS. 11 and 12).

Each stub shaft 93 is rotatably journaled in a circular support plate 100 which is fastened to the corresponding end wall of the hopper 87 by wing nuts 101 cooperating with fixed bolts, studs or the like. The plate 100 closes a large circular opening in the corresponding end wall of the hopper 87 through which opening the associated feeder member 90 can be axially withdrawn when required. Each feeder member 90 is provided at regular intervals along its length with dosing members that are generally indicated by the reference 102 but only one of which is visible in FIG. 11 of the drawings. Each dosing member 102 is afforded by a plate which extends perpendicular to the common axis of the corresponding tube 91 and stub shafts 92 and 93, said plate being formed at regular intervals around its opposite sides with perpendicularly projecting ribs 103, it being evident from FIG. 11 of the drawings that said ribs 103 are arranged alternately at opposite sides of the plate.

The bottom of each hopper 87 is formed at regular intervals along its length with triangular openings 104 and each bottom is embraced by a similarly curved, in cross section, masking member in the form of an elongated strip 105. Each strip 105 is formed at regular intervals along its length with rectangular outlets 106 arranged to cooperate with the openings 104 to a chosen extent by moving the strips 105 lengthwise of the bottoms of the hoppers 87. The neighboring ends of the two strips 105 are pivotally connected to the lowermost ends of corresponding levers 107 which levers have fulcrums afforded by pivot pins 108 that project forwardly from the front walls of the hoppers 87. Bent over portions of the two levers 107 are entered through arcuate slots in guide plates 109 that are mounted at the tops of the two hoppers 87. The uppermost ends of the two levers 107 are pivotally interconnected by a link 110 and either lever 107 can be moved to slide both strips 105 lengthwise of the bottoms of the hoppers 87 to increase, or decrease, the degree of register between the openings 104 and the outlets 106.

Figures 8, 9:
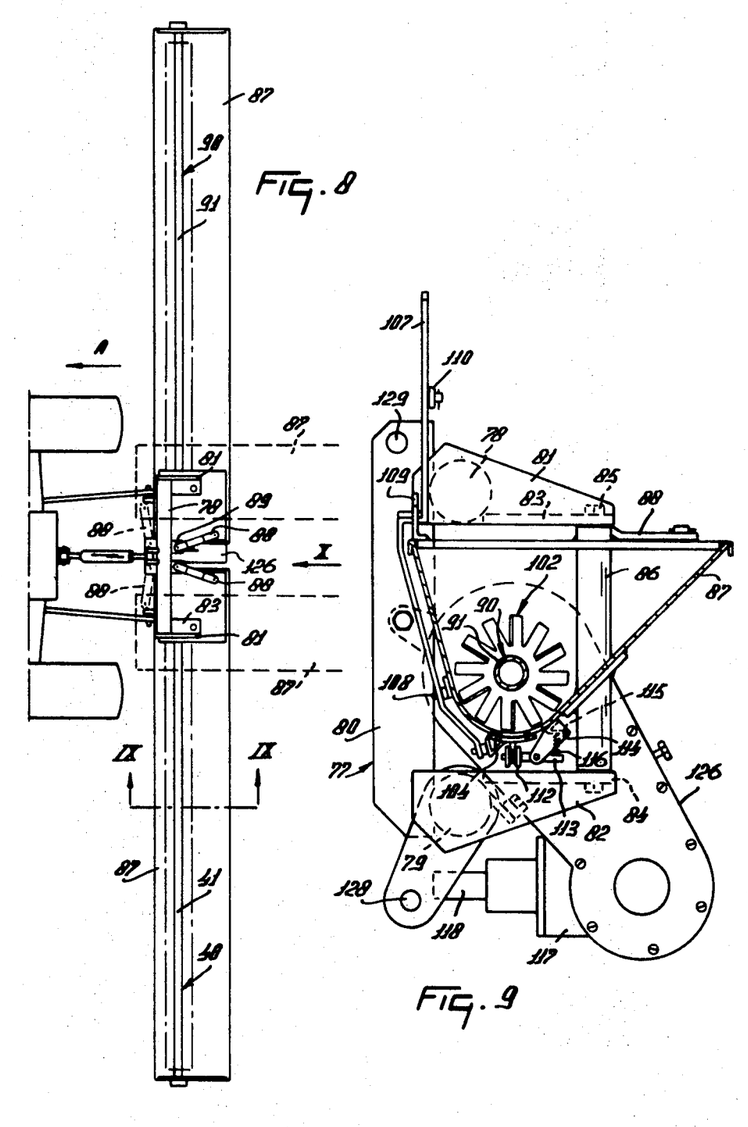
FIG. 8 is a plan view of a seed drill in accordance with the invention coupled to the rear of an agricultural tractor.
FIG. 9 is a section, to an enlarged scale, taken on the line IX—IX of FIG. 8.

The lowermost convex side of each strip 101 is provided at intervals along its length, between the outlets 106, with a downwardly projecting guide rail 111, each rail 111 cooperating with a corresponding with a corresponding roller 112. The arrangement of the rollers 112 can be seen in FIGS. 9 and 10 of the drawings from which it will be evident that each roller is rotatably mounted on one end of a small shaft 113 that is turnable about a pivot pin carried between two lugs 114 depending from the corresponding hopper 87 near the bottom of the latter. A compression spring 116 extends between the end of each small shaft 113 which is remote from the corresponding roller 112 and a small bracket 115 mounted between the corresponding pair of lugs 114 and it will be realized that the springs 116 tend to turn the shafts 113 about their pivotal mountings in a clockwise direction as seen in FIG. 9 of the drawings thus causing the rollers 112 to urge the strips 105 upwardly against the bottoms of the hoppers 87 by way of the rails 111.

Each feeder member 90 is arranged to be driven from a gear box 117 which is fastened to the lower beam 79. The gear box 117 has a forwardly projecting rotary input shaft 118 (FIG. 9) whose leading splined or otherwise keyed end is intended to be placed in driven connection with the power takeoff shaft of an agricultural tractor or other vehicle during the use of the seed drill by way of an intermediate telescopic transmission shaft (not shown) having universal joints at its opposite ends. The shaft 118 is provided, internally of the gear box 117, with a bevel pinion 119 (FIG. 10), the teeth of the bevel pinion 119 being in driving mesh with those of a larger bevel pinion 120 that is fastened to a shaft 121 which extends substantially horizontally perpendicular to the direction A. The shaft 121 also carries a sprocket wheel 122 which drives a larger sprocket wheel 124 by way of a transmission chain 123. The sprocket wheel 124 is fastened to a stub shaft 125 (FIG. 11) which is rotatably mounted in the walls of an upper region of a chain casing 126, said chain casing 126 extending upwardly from one side of the gear box 129 to a location between the neighboring ends of the two hoppers 87. The axis of rotation of the stub shaft 125 is substantially coincident with the axes of rotation of the two feeder members 90 when the seed drill occupies the operative position shown in full lines in FIG. 8 of the drawings.

Figure 10:
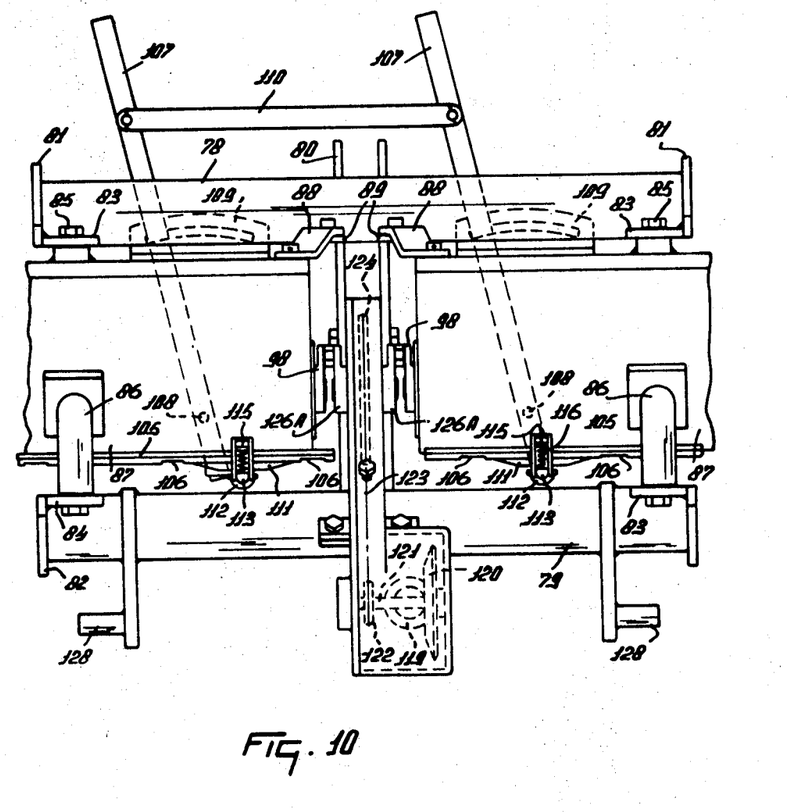
FIG. 10 is a rear elevation, to an enlarged scale, as seen in the direction indicated by the arrow X of FIG. 8.

The stub shaft 125 projects beyond the walls of the chain casing 126 and the projecting ends carry arms 126A both of which can be seen in FIG. 10 but only one of which is visible in FIG. 11 of the drawings. The free end of each arm 126A carries a face projection 127 which is larger than, but in the path of movement of, a corresponding one of the two face projections 99. It will be evident that, during use of the seed drill, the face projections 127 cooperate drivingly with the face projections 99. The seed drill is intended to be rear mounted on the three-point lifting device or hitch of an agricultural tractor or other vehicle in the manner which can be seen in outline in FIG. 8 of the drawings and, to this end, the lower beam 79 carries brackets provided with horizontally aligned pins 128 (FIGS. 9 and 10) while horizontally aligned holes 129 are formed in the upper ends of the vertical strips 80 for the reception of a horizontal pivot pin cooperating with the upper adjustable lifting link of a three-point lifting device or hitch.

In the use of the seed drill which has been described, it is connected to the three-point lifting device or hitch of a tractor in the manner which has just been mentioned and the input shaft 118 is placed in driven connection with the power takeoff shaft of the same tractor or other vehicle. The feeder members 90 are rotated from the gear box 117 through the intermediary of the cooperating face projections 99 and 127 and the volume of seed per unit time which is sown is governed by the settings of the two levers 107. When the seed drill is to be nonoperatively transported, the two strips 88 are first removed and the hoppers 87 are turned bodily about the studs 85 to bring them to the positions which are shown, in part, in broken lines in FIG. 8 of the drawings, it being evident that the hoppers 87 are then contained within the path of travel of the supporting tractor or other vehicle. Temporary removal of the link 110 interconnecting the levers 107 is also required. The strips 88 are replaced in the positions shown in broken lines in FIG. 8 of the drawings to positively maintain the transport position of the seed drill.

When cleaning, maintenance or repair of the feeder members 90 is required, they can be withdrawn axially through the openings in the ends of the hoppers 87 merely by temporarily removing the wing nuts 101. It will be realized that the corresponding plate 94 and arm 98 will be withdrawn with each feeder member 90 and that, upon subsequent replacement, it is only necessary to ensure that the notch 95 locates correctly with the dowel 96 to achieve the correct positioning of the plate 94 in the opening in the corresponding end wall of the hopper 87. It will be realized that, of course, the plate 94 and dowel 96 can be reached internally of the hopper 87 from the top thereof so that any manipulation required to line up the notch 95 with the dowel 96 can be effected without any difficulty. The ribs 103 on the dosing members 102 positively carry seeds towards the triangular openings 104 when the feeder members 90 are rotating and the rate of flow is controlled by bringing the outlets 106 into line with the openings 104 to a desired extent. It will be realized that the drawings show the outlets 106 completely out of register with the openings 104 so that no seeds will be sown. This arrangement is conducive to accuracy of the rate of sowing and it allows very small rates of flow of seed to be achieved. The effective outlet areas are always triangular and this allows seeds to flow at very low rates per unit time which would not be possible with, for example, narrow slotted openings where the short distances between the opposite sides of the slots prevent the passage of all but the very smallest seeds.

Having thus described my invention, what I claim as new and desire to secure by Letters Patent of the United States is:

1. A spreading implement comprising at least one troughlike container supported on a movable frame, said container having an outlet and an internal feeder member for moving material in said container to said outlet, said feeder member extending substantially the whole length of said body and being mounted for rotation in said container adjacent the bottom thereof, said feeder member being mounted between two support points which are located adjacent the opposite ends of said feeder member, a first end of said feeder member comprising a bearing secured to a support, and said support being releasably fastened to an apertured wall of said container by quick disconnect fastening means, the opposite end of said feeder member being freely supported and withdrawable from retaining means supported on a sidewall of said container, said opposite end of the feeder member and said retaining means cooperating to form a socket fitting whereby said first end of the feeder member can be unfastened from the container and then the entire feeder member, including at least part of said socket fitting, withdrawn through the aperture in said apertured wall without unfastening said opposite end.

2. An implement as claimed in claim 1, wherein said first end of the feeder member includes a bearing carried on a support plate and said support plate is connected to a wall to close the aperture through which the feeder member can be withdrawn, and said opposite end of said feeder member has a noncircular configuration which corresponds with a matching noncircular configuration of said retaining means to form said socket fitting.

3. An implement as claimed in claim 1, wherein said retaining means includes a dowel positioned to lodge in a notch of a support of said opposite end of the feeder member.

4. An implement as claimed in claim 1, wherein there are two containers that are positioned side by side in substantial alignment with one another during operation, each of said containers having at least one feeder member, said feeder members being mounted in a respective container to be readily removable from the relatively remotest opposite ends of said two containers, a common drive mechanism being connected to said feeder members and said drive mechanism being positioned between the neighboring ends of said containers, said drive mechanism including a rotary stub shaft mounted between said containers and said shaft having projections at its opposite ends which are positioned to cooperate drivingly with further projections located at adjoining ends of said feeder members, said further projections extending outside the neighboring ends of said containers, and each projection including elements which project from its respective feeder member to occupy a fixed position relative to the remainder thereof.

5. An implement as claimed in claim 1, wherein the bottom of said container is curved whereby the center of curvature substantially coincides with the axis of rotation of said feeder member when seen in cross section and the bottom of said container has an outlet comprising a plurality of openings which can be closed by a masking member, said masking member being mounted on said implement to be displaceable lengthwise relative to the container bottom, said masking member being spring loaded into locking engagement with said container bottom, said masking member having a side which is remote from the bottom of said container and said side having guides which cooperate with spring-loaded rollers associated with said bottom.

6. An implement as claimed in claim 2, wherein said retaining member includes a socket which is fastened to a driving shaft for rotating said feeder member and said driving shaft passes through a container wall.

7. An implement as claimed in claim 4, wherein each container has a masking member that is movable along the bottom thereof, the bottom of each container having a plurality of openings and said masking members having perforations that can be moved into more or less register with said openings, each of said masking members being connected to a lever which is fulcrumed on a side of its respective container, the levers being linked to one another for simultaneous control.

8. An implement as claimed in claim 4, wherein said containers are turnable about corresponding vertical axes for placement, in nonoperative position, said substantially vertical axes being spaced short distances from the neighboring ends of said side-by-side containers.